(12) United States Patent
Karuppusamy

(10) Patent No.: US 11,653,584 B2
(45) Date of Patent: May 23, 2023

(54) MULTIPURPOSE FARMING AND GARDENING MACHINE

(71) Applicant: Jayakumar Karuppusamy, Gangtok (IN)

(72) Inventor: Jayakumar Karuppusamy, Gangtok (IN)

( * ) Notice: Subject to any disclaimer, the term of this patent is extended or adjusted under 35 U.S.C. 154(b) by 0 days.

(21) Appl. No.: 17/760,296

(22) PCT Filed: Jun. 16, 2021

(86) PCT No.: PCT/IB2021/055294
§ 371 (c)(1),
(2) Date: Aug. 5, 2022

(87) PCT Pub. No.: WO2021/255653
PCT Pub. Date: Dec. 23, 2021

(65) Prior Publication Data
US 2023/0108428 A1    Apr. 6, 2023

(30) Foreign Application Priority Data

Jun. 17, 2020 (IN) .............................. 202031025555

(51) Int. Cl.
*A01B 33/10* (2006.01)
*A01B 33/06* (2006.01)
(Continued)

(52) U.S. Cl.
CPC .......... *A01B 33/065* (2013.01); *A01B 33/085* (2013.01); *A01B 33/106* (2013.01);
(Continued)

(58) Field of Classification Search
CPC ... A01B 33/065; A01B 33/085; A01B 33/106; A01B 33/148; A01B 49/025
See application file for complete search history.

(56) References Cited

U.S. PATENT DOCUMENTS

| | | | | |
|---|---|---|---|---|
| 416,880 A | * | 12/1889 | Whitehead | A01B 33/065 172/111 |
| 847,051 A | * | 3/1907 | Essick | A01B 33/065 172/75 |

(Continued)

FOREIGN PATENT DOCUMENTS

| | | |
|---|---|---|
| CN | 101124865 A | 2/2008 |
| CN | 201869530 U | 6/2011 |

(Continued)

OTHER PUBLICATIONS

International Search Report in International application No. PCT/IB2021/055294, dated Sep. 28, 2021.

(Continued)

*Primary Examiner* — Gary S Hartmann
(74) *Attorney, Agent, or Firm* — PV IP PC; Wei Te Chung; Zhigang Ma

(57) ABSTRACT

A multipurpose agro-farming and gardening machine for earth pit digging, tilling, raking, soil bed preparation on plain terrains, as well as in sloppy terrains in hilly areas, weeding, manuring and seeding, with augers, raking rods, compost or manure and seed drop attachments for use in small farms and home gardening. Machine of the proposed invention comprises three rotary soil excavating augers (7) and a linear actuator (2) for driving the assembly of augers to dig into the soil for making pits or for making trenches with adjoining raised beds. Attachments enable adopt double digging practices for preparation of soil beds, manuring and seeding comprising [i] raking rods with spikes for deep digging and [ii] attachments for compost or manure drop and seed drop.

16 Claims, 5 Drawing Sheets

(51) Int. Cl.
  *A01B 33/08* (2006.01)
  *A01B 33/14* (2006.01)
  *A01B 49/02* (2006.01)
  *A01B 49/06* (2006.01)

(52) U.S. Cl.
  CPC .......... *A01B 33/148* (2013.01); *A01B 49/025* (2013.01); *A01B 49/06* (2013.01)

(56) References Cited

U.S. PATENT DOCUMENTS

| | | | |
|---|---|---|---|
| 4,243,104 A | | 1/1981 | Sipos et al. |
| 4,323,125 A | * | 4/1982 | Pronovost ............ A01B 33/065 172/78 |
| 10,405,473 B2 | | 9/2019 | Gray et al. |
| 2016/0150713 A1 | * | 6/2016 | Maggard .............. A01B 33/106 172/523 |
| 2018/0027722 A1 | * | 2/2018 | Li .......................... B62D 55/10 |

FOREIGN PATENT DOCUMENTS

| | | | |
|---|---|---|---|
| CN | 202385470 U | | 8/2012 |
| CN | 203708766 U | | 7/2014 |
| CN | 106879286 A | | 6/2017 |
| CN | 107493704 A | * | 12/2017 |
| CN | 112889368 A | * | 6/2021 |
| DE | 19744788 A1 | * | 4/1999 |
| RU | 2048714 C1 | | 11/1995 |

OTHER PUBLICATIONS

Written Opinion of the International Search Authority in International application No. PCT/IB2021/055294, dated Sep. 28, 2021.

* cited by examiner

MULTIPURPOSE FARMING AND GARDENING MACHINE

FIELD OF INVENTION

The present subject matter described herein, in general, relates to a kind of agricultural machinery and is more particularly directed to a multipurpose farming and gardening machine, for preparing the soil and performing a plurality of agrotechnological working processes with a single machine.

BACKGROUND OF INVENTION

Raking of soil is a primary activity undertaken to aerate and nourish the soil, for manuring and to drill holes on earth for planting. The loosening of the earth also makes it easier for seeds to germinate and grow. Machines are used in farming and gardening for soil preparation, for sowing seed or planting.

Tilling and ploughing activity in farms breaks up the hardened structure of the soil, which aid in drainage and root growth. Tilling fields also help nourish the soil with organic matter by increasing decomposition and formation of nutrients in the soil. Raking and puddling of heavy-textured soil helps increase total soil volume and ensures better water retention. Ridge and soil bed formation with troughs/trenches can be made easier with machines for home gardening and small size fields for growing horticultural crops, as also for adopting intensive and intercropping cultivation practices.

The tillage machinery and implements are very useful in dry & hard land conditions and where scouring is difficult. Tillage results in soil turning, soil mixing, soil raising and soil breaking. Tillage also facilitates effective cutting of stubbles, weed removal and mixing of manure.

Many vegetables, leafy edible greens and herbaceous plants can be grown from seed sown outdoors. The prerequisite for successful cultivation of agriculture and horticulture crops and vegetables, is the preparation of good seedbed, free of weeds and with a crumble-like soil-surface texture.

Mechanization of farms and home gardens help increase productivity in growing vegetables and crops. It helps contribute to rural modernization by the popularization and utilization of agricultural machinery, promote the cooperative utilization and heighten the utility of the agricultural machinery.

Machinery for tillage helps create a good seedbed with less soil compaction to enable seedlings-grow more easily. Air exchange is facilitated, and water penetrates more rapidly. Also, competing plant species are injured or killed with tillage. In annual cropping systems, even in no-till systems, it is necessary to disturb soil to place a transplant or seed.

Tilling is a process of preparing the soil for the cultivation of seeds by digging, ploughing and overturning of the soil. It ensures proper mix up of the nutrients and uproots the weeds growing beforehand. The practice of double digging is also preferred, where the soil is compacted, where ground has not been previously cultivated, where demanding long-term plants are planned or when making raised beds. Raised beds are popular for growing fruit and vegetables, as they augment drainage. Mulches are later useful as 'top-dressing' throughout the growing season, as they gradually decompose into the top layer of soil adding additional nutrients.

Tillage employed in farming and gardening refers to many types of mechanical operations that move soil to change soil conditions, manage crop residues, and manage weeds, or manuring and/or seeding. Specific tillage systems are often referred to in terms of the kind of tillage implement used,—such as a plough, roto-tiller, spader, strip tiller, ripper, harrow discs assembly, gangway with tines etc. Tillage systems are also referred to by their overall objective, such as conventional tillage, conservation tillage, no-till, or reduced tillage. Secondary tillage, which refers to soil disturbance following primary tillage, is designed to prepare a seed bed or achieve some other specific objective, such as soil amendment, loosening, weeding etc.

The purpose of the tiller machine is to prepare the soil for cultivation more easily and efficiently than with manual labour or drought animals, with the employment of power to draw the ploughing and other tillage equipment. Machines, farm equipment and implements commonly used with tractors/or powered by IC engines are known by terms such as cultivators or tillers and employ disk harrows gangs, hoes, ploughs, furrow openers, tines and their assembly thereof.

Tine styles that are available very from "blade" types designed to avoid "tangling" of green matter in the tine sets, to pointed pick tines or rotary tines that can turn under organic matter such as cover crops, for soil improvement. Rotary tillers driven by the tractor's out-put shaft are commercially available. During operation, the soil is crumbled by the rotating and forwarding of the blades fixed on the shaft.

Home gardening work could be made more enjoyable with the manual component of work and drudgery being reduced, with machines that can help to prepare the soil for planting and for tending the garden. Raking the soil is usually done before planting the seeds or saplings to break up the earth and loosen the soil.

Several secondary farming equipment and gardening hand tools are available in the market which are attachment to tractors, or independent self-propelled machines with IC engines running on petrol or diesel.

Document U.S. Ser. No. 10/405,473 B2 disclosing a tillage apparatus for selective primary tillage and seed bed preparation makes use of a selectively moveable primary tillage shank to provide seasonal, in-field and/or on-the-fly flexibility of tillage operation. The tillage apparatus has a cultivator frame, at least one secondary tillage tool mounted on the frame and a primary tillage shank mounted on the frame, the primary tillage shank selectively moveable between a lowered soil engaging position and a raised disengaged position. In a method of tilling or preparing a seed bed, the tillage apparatus is dragged around a field with at least one secondary tillage tool engaged with the field, when secondary tillage of the field as desired, and the selectively moveable primary tillage shank lowered to be engaged with the field, when the field is in need of primary tillage or raised to be disengaged from the field when primary tillage is not desired.

Document CN201869530 U discloses a machine for rotary tillage, furrowing, ridging, weed burying and seed covering, which belongs to the technical field of agricultural machinery. The machine comprises a rack, a rotary-tillage knife roll, a gearbox, a transmission case, a furrow opener, an installation rack, an auger and the like, wherein the gearbox and a traction rack are arranged above the rack, one side of the rack is provided with the transmission case, the rotary-tillage knife roll is arranged below the front end of the rack, the auger is arranged below the back end of the rack, and the furrow opener is arranged below the back end of the auger by the installation rack and the auger is connected with the gearbox by the transmission case and a transmission shaft. By the machine disclosed by the utility model, the operations of rotary tillage, furrowing, ridging, weed burying and seed covering are finished by one step, and the problems that the furrowing and the ridging of a traditional furrow opener are slow, the furrowing depth is shallow, the furrowing and ridging operations only can be simply carried out, and the operations of soil generated in the furrowing process, weeds in a field and crop seeds sown at the surface of the soil cannot be carried out and must be finished by dint of other machines or manual secondary operations are solved. The machine disclosed by the utility model is especially suitable for the operations of a farmland with large soil humidity and many rhizomatic weeds.

Document CN101124865A discloses a multi-purpose machine used for rotary plowing, ridging and fertilizing and matched with a tractor. The rear of a rotary plow is additionally provided with a ridging device and a fertilizing device wherein, the ridging device comprises a ditching plow and a plow pole, while the fertilizing device comprises a fertilizing box, a manuring pipe, a soil wheel, a fertilizer-arranging wheel, a chain wheel, as well as a chain and a coulter. The plow pole is fixed on the rotary plow by an upper beam and a lower beam, the fertilizing box is fixed on the upper beam, while the soil wheel is articulated on the lower beam. It can be adopted to complete all operations once, such as rotary plowing, ditching and ridging, as well as deep fertilizing, etc., thus the manpower is saved, and the labor intensity is reduced and the operating quality is promoted, especially the operating efficiency can be improved more than five times.

Document U.S. Pat. No. 4,243,104 A discloses a soil cultivating machine has a pair of frame units inclined rearwardly divergently to each other, each frame unit having a respective tool-holding shaft. Each shaft is associated with two tool-holding bars, one in front of the shaft and one behind it. The bars carry deep-tilling implements, while the shafts carry disc-like tools. There is a prescribed numerical relationship between the depth of tilling by these implements and the distance, measured in a direction parallel with the direction of advance of the machine, between a given implement and the associated disc-like tool. There is a further prescribed numeral relationship between this distance and the velocity of advance of the machine.

However, most of the conventional tillage equipment and machines are for use in large farms and fields. Small farms and backyard gardening require much more compact, versatile and smaller machines well suited for all-purpose use, such as plant bed preparation, scouring/tilling, levelling soil beds, raking soil lumps for removing weeds, double digging of trenches and formation of raised beds, manuring of deep soil layers, seeding and digging of pits, where samplings are to be planted.

Further, most of the conventional machines are directed to perform a single type of operation. None of the conventional arts provides versatility of performing multiple soil preparation or agro-technological working processes with a single machine. The conventional machines are suitable to be used in large fields and require special skills for operating the machines. Moreover, these existing machines consumes more time and are more complex to use, which is a major problem associated with the existing agricultural machines.

Accordingly, there is a dire need to provide an agricultural multipurpose user friendly machine, which is well suited to be used in small farms, backyards and home gardens and is capable of performing multiple soil preparation, tilling, raking, weeding, formation of level plantation beds on normal terrains or terrace beds on sloppy terrains, dropping seeds/manure, digging of holes for planting saplings, soil levelling and other agricultural processes, which ultimately removes the association of mental images of hard, arduous labor for agriculture and farm based activities.

SUMMARY OF INVENTION

This summary is provided to introduce a selection of concepts in a simplified format that is further described in the detail description. This summary is not intended to identify key or essential inventive concepts.

An object of the present invention is to overcome the problems associated with the prior arts.

Another object of the present invention is to provide a multipurpose agricultural machine which is well suited to be used in small farms, backyards and home gardens and is capable of performing multiple soil preparation, tilling, raking, weeding, formation of plantation beds, seed/manure drop, digging of holes for planting saplings and other agricultural processes.

Yet another object of the present invention is to provide a multipurpose agricultural machine which can work on slopes to make terrace beds suitable for plantation on slopped terrains in hilly areas.

Another object of the present invention is to provide a multipurpose agricultural machine which is mounted on a hand operated trolley, consisting of wheels for easy transport and movement of the machine, or alternatively if needed, with power assisted traction for moderate and larger fields.

Yet another object of the present invention is to provide a multipurpose agricultural machine which is user friendly and does not require any special skills for operating the machine.

Another object of the present invention is to provide a multipurpose agricultural machine which saves time and increases productivity in gardening, growing of horticulture crops and engaging in small farm activities. Youth who otherwise turn away from agriculture and horticulture perceiving them as hard labour can be attracted with the idea of mechanization in farming, which is affordable and manageable, requiring moderate investment of effort, skills and investments.

Yet another object of the present invention is to provide a multipurpose agricultural machine which has a number of component assemblies and associated knowhow which can interest and intrigue a common rural educated youth, encourage him to embrace farming activities, pursue professions related to growing crops and vegetables, agro-processing and contribute to the rural economy. Hobbyists likewise, can with moderate investment of time and effort pursue greening of their backyards and produce garden vegetables for their home use, while reaching their produce to local vendors with increased production of vegetables and crops.

Still another object of the present invention is to provide a multipurpose agricultural machine whose fabrication could be done in a home workshop or in fabrication units run as a small enterprise. Entrepreneurs with the know-how that has been shared, can make adaptations, improvements and optimize the machine to suit varied applications, produce and market them for their local community of farm and garden enthusiasts.

Accordingly, in one aspect, present invention provides a multipurpose agricultural machine, wherein said machine comprising:

(a) an auger assembly positioned inside an outer housing comprising:

at least three rotary soil excavating augers configured to rotate to rake and remove soil;

at least one deflector plate;

(b) a composite flange assembly comprising:

(i) at least one top flange mounted on a central axial shaft; and (ii) at least one bottom flange mounted on the central axial shaft;

(iii) the axial shaft mounted on bearings on the top and bottom cover at either end of the machine housing, with such axial shaft also passing though a bush on the top and bottom cover end, beside the bearing block to permit axial movement of the shaft, capable of pushing the assembly downward or upward (iv) a rotary drive which engages to operate a piston type linear actuator or a screw rod with nut arrangement to which the central axial shaft with composite flange and auger drive assembly is coupled, so as to push the axial shaft and assemblies with the augers to dig into the soil or to reverse and retrieve it (v) plurality of auger shafts sliding within the flange assembly, in communication with the rotary soil excavating augers;

(vi) at least three spring mounted outer blocks with spring loaded sliding bearing mounts to hold one end of the three outer auger shafts on the bottom surface of the top flange;

(vii) at least three spring mounted outer blocks with spring loaded sliding bearing mounts to hold the other end of the three outer auger shafts on the bottom surface of the bottom flange;

(viii) at least three inner blocks with radially sliding bearing mounts to hold one end of the three inner auger shafts on the top surface of the top flange;

(ix) at least three inner blocks with radially sliding bearing mounts to hold the other end of the inner auger shafts on the top surface of the bottom flange;

(x) radial guides and slots for the auger shafts seated on bearings in their mounts, on all the inner and outer blocks, to enable them move inward or outward within such blocks (xi) spring loading of bearing mounts on the three outer blocks, for ease of retraction to reverse inward movement (xii) involute guideway slots on the top and bottom flange, in which the auger shafts get guided with the operation of a lever, to enable bring the augers towards each other or move them outward (xiii) at least one lever configured to effect radial inward or radial outward movement of the auger shafts with respect to the central shaft axis;

(xiv) a screw at the end of the lever for effecting transverse movement, with a fastening nut holding wheel to lock the flange assembly to the housing once adjustment of the distances between the augers are done or alternatively a ratchet and pawl mechanism for unidirectional movement, lock or release, as may be required to arrest and lock the transverse movement for changes to the distance between the augers wherein the rotary soil excavating augers are connected with plurality of sleeves and plurality of bolts on to either, three pairs of inner blocks or three pairs of outer blocks and such inner and outer blocks are arranged along a radial direction on the two flanges with the lever;

(c) an auger drive arrangement within the flange assembly as in (b) above positioned inside the machine housing comprising:

(i) at least three chain driven sprocket wheel pinions, mounted on the inner three auger shafts held at either end, on the bearings within the three sliding bearing mounts, within the inner blocks, on the top surface of both the flanges and (ii) at least three chain driven sprocket wheel pinions, mounted on the outer three auger shafts held at either end on bearings within the three spring mounted sliding bearing mounts, within the outer blocks, on the bottom surface of both the flanges.

(iii) a chain weaving on the outer surface of the sprocket wheels on the three outer auger shafts and along the inner surface of the sprocket wheels on the three inner auger shafts (iv) a motor positioned in the axial direction of the flange assembly, coupled and driving one of the auger shafts between the outer blocks;

wherein the auger drive arrangement and flange assembly is mounted on a hand operated trolley and comprises a linear actuator or screw rod/nut assembly arrangement is driven by a motor is coupled to drive the central axial shaft and is positioned in the axial direction of the flange assembly with the rotary soil excavating augers configured to drive the augers into the soil or retract them from out of the soil.

Soil Excavation and Plantation Bed Preparation: The three auger shafts and the motor for rotary motion of the auger shafts, enables the augers to excavate soil to form trenches in the soil field, while deflecting the excavated soil to form plantation beds, by the side of the trench, as the machine on its trolley is moved along the field.

Changing width of trench or plantation bed: The operating lever, for change of width of trench and the corresponding width of the plantation bed, is in the form of a screw rod with a tightening wheel with the nut fastener configured to grip on the outer housing, so as to lock the adjusted radial distances between the augers from the central shaft axis, with the operation of the lever having the effect of changing the distance between the auger shafts, while ensuring that the chain drive is engaged even with change of distances between the augers.

Alternate Lock of adjusted distances between augers: The machine alternatively comprises a ratchet and a pawl mechanism on the outer end of the flanges configured to ensure unidirectional movement and holding the auger shafts in place after adjustment of the radial distances between the augers and for release to readjust the distances as required.

Traction and movement of the Machine: The machine mounted on a trolley to enable its movement in the field to make troughs/plantation beds or to move between pits to be dug on the field at desired locations, for planting samplings or for transplantation, wherein the hand operated trolley comprises at least two wheels with tires and at least two metallic spiked wheels, that enable better traction on the field. Electric Motors or internal combustion engines are optionally fitted for traction to the wheels to assist movement in the field.

Independent suspension on the four wheels: The hand held trolley comprises a double wishbone independent suspension for each of the wheels comprising at least two parallel wishbone-shaped arms which supports a bearing hub/housing with bearing holding a short axle connected to the wheels. The bearing hub/housing is welded to the frame of the trolley frame. The arrangement enables independent movement of all the four wheels, so as to enable (a) operate the machine with ease on uneven terrain (b) or move along sloppy terrains in hill areas in order to make terraced plantation beds along the slope.

Height adjustment of wheels on one side: The wheels comprises height adjustment feature on the trolley configured to aid movement on steeped sloppy terrains.

Furrow Openers for manuring or seeding: The hand held trolley comprises a dual inclined disc furrow opener configured to seed plantation openers configured to facilitate manure or seed drop inside the soil bed. The trolley frame has the arrangement for adjustment of the height of the inclined disc furrow openers to enable vary the depth of the furrows opened to drop the manure or seeds.

Deflecting soil for plantation bed preparation: The machine comprises an inclined deflector plates (optionally involute shaped or appropriate adapted cross section profile) configured to channelize the soil removed from field during trench formation to be deflected to form raised beds by the side of the trenches that are made, as the machine is moved along the field.

Mechanism for change of distances between augers: The radially inward movement of the auger shafts, the lever is operated through 120 degrees to slide the auger shafts along the involute guideway slot on the flange assembly and along the radial guides in the inner and outer blocks.

Raking of soil: The rotary soil excavating augers may be replaced with plurality of spiked raking rods configured for deep raking to loosen hard lumps or used in deep digging applications for applying manure in the deeper layers of the soil.

Motor and chain drive for rotation of the augers: The machine as claimed in claim 1, wherein the motor to drive the auger shafts with a chain drive is a DC motor or a Stepper motor. Alternatively, an internal combustion engine can be used to provide rotary drive to one of the auger shafts Raking Rods: The raking rods are toothed picket bars, with protruding sharp edges arranged in a direction perpendicular to the bar, in the radial direction.

Manure/Compost drop arrangement: The machine comprises a primary hopper with half left handed and half right handed screw to move the manure or compost to the centre to enable such manure be guided and pushed into the secondary hopper which has a rotary feeder drum to loosen clumps and feed them into the transparent gravity drop chute attachment to feed manure or compost into into the transparent gravity drop chute attachment to feed manure or compost into Seeding Arrangement: The machine comprises a primary hopper chamber mounted above the drive assembly housing with the auger feeding the seeds on to a secondary hopper chamber with a rotary churning and a feeder drum acting as a metering device to drop the seeds into transparent gravity feed drop chute, on to the plantation beds aided by the furrow opener. The optional adjustment of the furrow opener up and down vertical slide movement on the trolley frame enable seed to be dropped at the desired depth within the plantation bed.

Traction on the field for movement of the machine: The machine optionally may comprise a battery driven DC motor or an internal combustion engine configured to motorize the hand operated trolley, providing traction for movement in the field, with a disc brake to control or stop movement.

In an implementation of the present invention, the three rotary soil excavating augers are connected with plurality of sleeves and plurality of bolts on to the auger shafts which are held either between, (a) three pairs of inner bearing mounts, sliding within the inner blocks arranged radially, on the top surface of the two flanges or (b) three pairs of spring mounted outer bearing mounts, sliding within outer blocks arranged radially on the bottom surface of the two flanges.

In an implementation of the present invention, there is provided a auger drive assembly positioned inside the drive assembly housing, comprising at least six chain driven sprocket wheel pinions, with (a) three sprocket wheel pinions mounted on the inner three auger shafts, held within three inner bearing mounts, sliding within the three inner blocks on the top surface of the two flanges and with (b) the three other sprocket wheel pinions mounted on the outer three shafts, held on spring mounted bearing mounts, sliding within the three outer blocks on the bottom surface of the two flanges.

The central axial shaft with holds the auger drive assembly is mounted on bearings at either end of the housing, on the hand operated trolley, with a linear actuator driven by a motor positioned in the axial direction at the top end of the shaft. The linear movement of the piston type actuator at the top end of the central axial shaft, pushes the auger drive assembly, with the three rotary soil excavating augers into the soil, for soil excavation, and with the retraction of the actuator, pulling back the augers out of the soil.

In an implementation of the present invention, the three augers are mounted with sleeves and bolts either on the three inner auger hold shafts and three outer auger hold shafts, and the auger shafts with sprocket wheel chain pinions are driven by a chain drive with a motor providing the rotary torque on one of the three auger shafts—to drive the rotary soil augers.

In an implementation of the present invention, the machine comprises a compost drop attachment configured to feed compost into a furrow opened in the soil. Such furrow opening in the soil, prior to compost/manure or seed feed is performed by the inclined disc rotary furrow openers placed between the front and rear wheels of the trolley. The disc furrow openers are fixed on a shaft mounted at either end, on bearings, within a housing which is welded to the trolley frame.

Further, the seed or manure drop mechanism comprises a primary hopper chamber, mounted above the drive assembly housing, with an auger feeding the compost on to a secondary hopper chamber with a rotary churning and a feeder drum configured to breaks the lumps of compost into the transparent gravity feed drop chute or to meter the seeds into the gravity drop transparent chute for seeding purposes.

The above aspects and the advantages will be more clearly understood from the following detailed description taken in conjunction with the accompanying drawings and claims.

DESCRIPTION OF DRAWINGS

It is appreciated that the drawings provided in the present disclosure only illustrate application examples of the present disclosure and are therefore not to be construed as limiting its scope. The foregoing disclosure provides additional information with additional specificity and detail with the accompanying drawings, which are listed below for quick reference.

Figure 1:
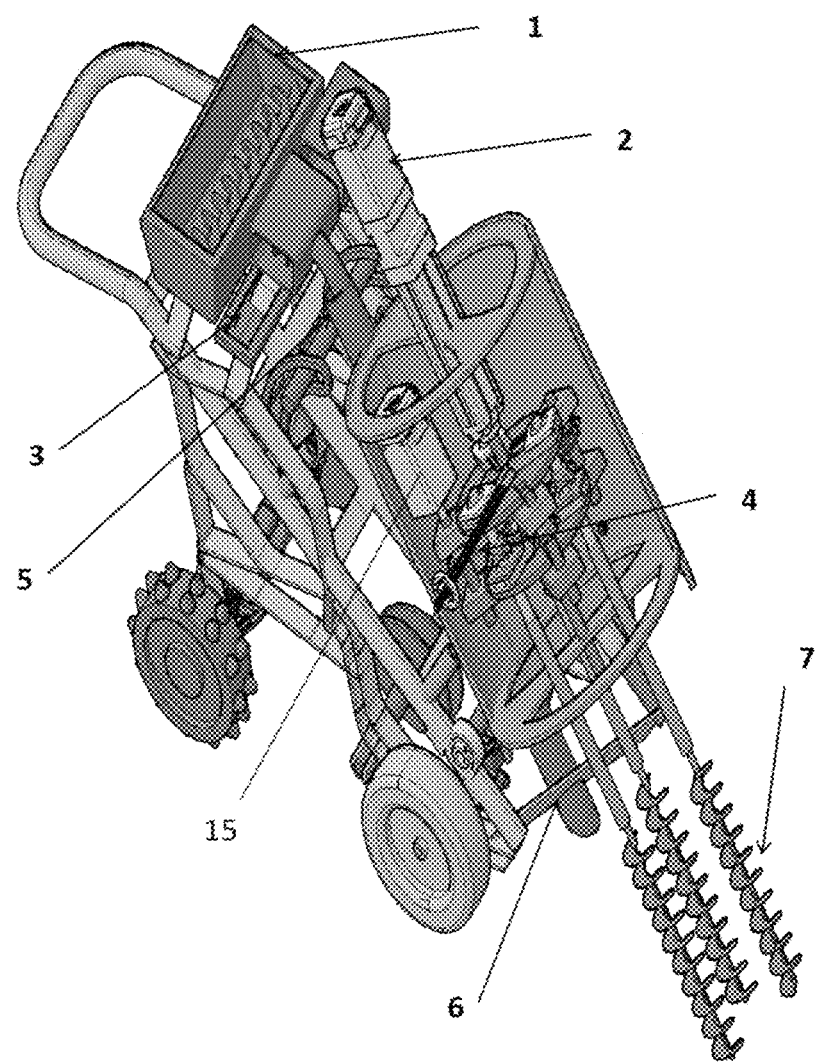
FIG. 1 illustrates a schematic isometric front-view of the multipurpose agricultural machine, in accordance with an embodiment of the present disclosure.

It may be noted that the one or more elements may have been represented in the drawings by conventional symbols, and the drawings may show only those specific details that are pertinent to understanding of the embodiments of the present disclosure, so as not to obscure the drawings with details that will be readily apparent to those of ordinary skilled in the art having benefit of the description herein.

DETAILED DESCRIPTION OF PREFERRED EMBODIMENTS

It should be understood at the outset that although illustrative implementations of the present disclosure are detailed below, the present invention may be implemented using any number of techniques, whether currently known or in existence. The present disclosure should be in no way be construed as being limited to the illustrative implementations, drawings, and techniques, illustrated below, including the exemplary design and implementation illustrated and described herein, but may be modified within the scope of equivalents.

Unless otherwise defined, all terms and especially technical and/or scientific terms, used herein, may be taken to have the same meaning as commonly understood by one ordinarily skilled in the art.

Reference is made herein to some "embodiments". It should be understood that an embodiment is an example of a possible implementation of any features and/or elements presented in the claims. Some embodiments have been described for the purpose of illuminating one or more potential ways in which the specific features and/or elements of the foregoing claims fulfill the requirements of uniqueness, utility, and non-obviousness.

Accordingly, in one implementation, the present invention as embodied and broadly described herein provides a multipurpose agricultural machine which is capable of (i) digging pits, (ii) raking of soil, (iii) making trenches/troughs and plantation beds beside the trenches (iv) formation of terraces on sloppy terrains (v) soil levelling (vi) tilling/removal of weeds (vii) manuring, (viii) seeding, as also applications such as double digging, for enriching the deeper layers of soil or for soil amendments. The machine is well suited for planting in small farms and home gardens, double digging and terrace bed preparation on sloped hilly terrains.

In an implementation of the present invention, the machine has three augers which rotate to rake and remove soil for making pits or when moved along a path makes troughs/trenches making raised plantation bed on one side of the trench with the inclined (or involute shaped) deflector plate attachment, which can optionally, be also used as a leveler.

In an implementation of the present invention, the auger drive assembly with the three augers are driven into the soil in the axial direction of a piston type linear actuator for measured depth of pitting, or trench formation and thus controlling the depth of trough or pit being made.

In an implementation of the present invention, a lever in the auger assembly when rotated in a radial direction through 120 degrees, around the central axial shaft,—makes the three auger shafts move towards each other, sliding through guideway slots on the two flanges mounted on the axial shaft, within the auger drive assembly.

The movement of the lever has the effect of moving the auger shafts between the three inner blocks on the top flange and the inner blocks on the bottom flange, radially inwards towards the axial shaft. And likewise move simultaneously, the auger shafts between the three outer blocks on the top flange and the three outer blocks on the bottom flange, radially inwards towards the axial shaft. The movement of the auger shafts is guided on the radial involute guideway chute on the flange. When reversed back, the auger shafts move away from each other, retracting along the involute guideway in a radially outward direction. This arrangement to change the distances between the augers, allows for variation in the width of the trench being made and the associated plantation bed.

In an implementation of the present invention, the augers are driven with chain drive with rotary torque/speed controlled from a DC motor or stepper motor.

In an implementation of the present invention, the length of chain (driving) rotation of auger shafts is maintained even during changes in distances between the augers, with mechanisms enabling sliding auger drive shafts and configurations of mounted pinions driven by the chain drive. The auger shafts rotate within the two sets of inner and outer bearing mounts sliding within the radially arranged blocks on either side of the two flanges.

In an implementation of the present invention, the soil removed in the trenches is channelized with an inclined deflector plate to form raised beds by the side of the trenches that are made.

In an implementation of the present invention, the deflector plate with inclination removed and fitted perpendicular to the plantation bed can help in levelling the bed.

In an implementation of the present invention, the augers can be replaced with spiked raking rods for a second pass double digging. The rakes are toothed picket bars, with protruding sharp edges arranged in a direction perpendicular to the bar, in the radial direction. When used in place of augers, it can perform raking, tilling or scoring the soil in the deeper soil layer. The compost/manure drop attachment in the machine can be used during the second pass of the machine for dropping compost in the deeper soil layer, along the trenches dug in the first pass, as is the recommended practice for double digging.

In an implementation of the present invention, compost/manure is fed into the raked layer of earth with the compost drop attachment. A primary hopper is mounted above the auger drive assembly housing with an auger in the transverse direction within the hopper. The auger is half left handed and half right handed to enable the compost move towards the central area of the hopper. The manure is pushed through the holes in the primary to the secondary hopper chamber with rotary churning and feeder drum, which breaks the lumps of compost into the transparent gravity feed drop chute. When primary and secondary hoppers are used for seed drop, the feeder drum in the secondary hopper, serves as a metering device for seed drop in the chute.

In an implementation of the present invention, with reduced height adjustments on the two telescopic legs (optionally fitted) on one side parallel to auger axis combined with the independent suspension of wheels, the machine can work on slopes, to make terrace beds suitable for plantation on sloped terrains in hilly areas.

In an implementation of the present invention, the auger assembly is mounted on hand operated trolley with wheels with tires at the rear end, as the trolley is pulled forward, while the front wheels are metallic and spiked to facilitate traction. Optionally, in place of hand pulling, the trolley can be motorized, with the use of battery driven DC motor or internal combustion engine for its movement in the field.

The machine disclosed in the present disclosure is capable of digging pits, raking to remove weeds and breaking lumps, making trenches/troughs with raised plantation beds besides the trenches, formation of terraces on sloppy terrains, soil tilling, soil bed levelling, manuring, seeding. The machine is well suited for planting in small farms and home gardens.

The machine of the present invention comprises of three rotary soil excavating augers (or optionally raking rods with spikes replacing the augers), deflector plate, manure and seed drop primary hopper, rotary churning and feeder drum in the secondary hopper, drop chute and a rotary DC motor drive for driving the auger shafts with chain around pinions on such shafts, a linear actuator for driving the assembly with augers dig into the soil for controlled depth excavation and retraction,—with the entire assembly and attachments mounted on a hand pulled trolley (optionally fitted with motor for ground transportation).

The machine can be used for (a) making pits (b) making trenches with adjoining raised beds (c) double digging with an additional second pass for manure/compost drop (d) opening furrows for seed drop in the soil bed (e) making terraces on hill slope terrains (f) tilling the soil with rakers to remove weeds and break hardened soil lumps and (g) levelling a soil bed.

The machine can be used for soil loosening and/or removal, digging pits and for formation of troughs/trenches and formation of raised beds in small farms and home gardens, as also for manuring and seeding. With reduced height adjustments on the two legs on one side parallel to auger axis/direction of trolley travel, combined with the independent suspension provided on the front spiked metallic wheels and the rear inflated tyre wheels, the machine can work on slopes to make terrace beds, suitable for plantation on sloped terrains in hilly areas.

FIG. 1 illustrates a schematic front view of the multipurpose agricultural machine and it discloses a primer hopper (1), linear actuator (2) for pushing auger drive assembly into the soil, secondary hopper (3) with rotary churning and feeder drum, lever handle for transverse movement of flange to change the distance between the auger shafts terminating in a screw and knob handle for gripping on the outer housing, once adjustment is made (4), manure and seed drop chute (5), inclined deflector plate (6) and augers for soil digging (7).

The soil digging is performed by augers. Three augers are engaged through a mechanism that enables carry out changes in the radial distance of the augers with respect to the central shaft axis, thereby making it possible to vary the diameter of the hole or width of the trench, that is being made on the field.

The machine has three augers which rotate to rake and remove soil for making pits or when moved along a path makes troughs and raised beds on one side beside the trench making use of the soil excavated, pushing and layering them with the inclined (optionally involute shaped) deflector plate (6) attachment. The auger drive assembly is driven into the soil with the linear actuator (2) which can control the depth of trough or pit, as the case may be and the augers or rakers can be mounted with sleeves and bolts on to either the three inner shafts between the pairs of inner blocks on the two flanges or on the three outer shafts between the pairs of outer blocks on the two flanges. A handle in the auger assembly when rotated in a transverse radial direction upto 120 degrees, makes the augers move towards each other. When reversed the augers move away from each other.

Further, the augers are driven with chain drive weaved across sprocket wheel pinions on the three inner and three outer shafts, with rotary torque/speed controlled from a DC motor (15) or stepper motor. The drive for rotation of augers is maintained even during changes in distances between the augers. The auger shafts held on bearings in their mounts, slide within the three inner and three outer blocks on each of the two flanges. The six sprocket wheel pinions on the auger shafts, are driven by the drive chain weaved across such pinions. Three of the pinions are mounted on the three inner shafts held on bearing mounts sliding within the three inner blocks on the top flange and the three inner blocks on the bottom flange on the central axial shaft. The inner blocks are arranged radially on the top surface of both the flanges and have guideways for the sliding bearing mounts holding the auger shafts. Similarly the remaining three pinions are mounted on the three outer shafts held on bearing mounts sliding within the three outer blocks on the top flange and the three outer blocks on the bottom flange on the central shaft. The bearing mounts are spring loaded on the outer blocks, to enable retract back with activation of the lever to move back the auger shafts in an outward direction away from each other.

The three augers or three raking rods can be fitted with sleeves and bolt on either the three auger shafts mounted between the outer blocks or on the three auger shafts mounted between the inner blocks. The soil removed in the trenches is channelized in an inclined deflector plate (14) to form raised beds by the side of the trenches that are made. The augers can be replaced with spiked raking rods for a second pass double digging. During the second pass double digging, compost can be fed into the raked layer of earth. In the present invention, the primary hopper is mounted above the drive assembly housing and a churning and feeder drum in the secondary hopper breaks lumps of compost or meters the seed into the gravity feed drop chute.

Figure 2:
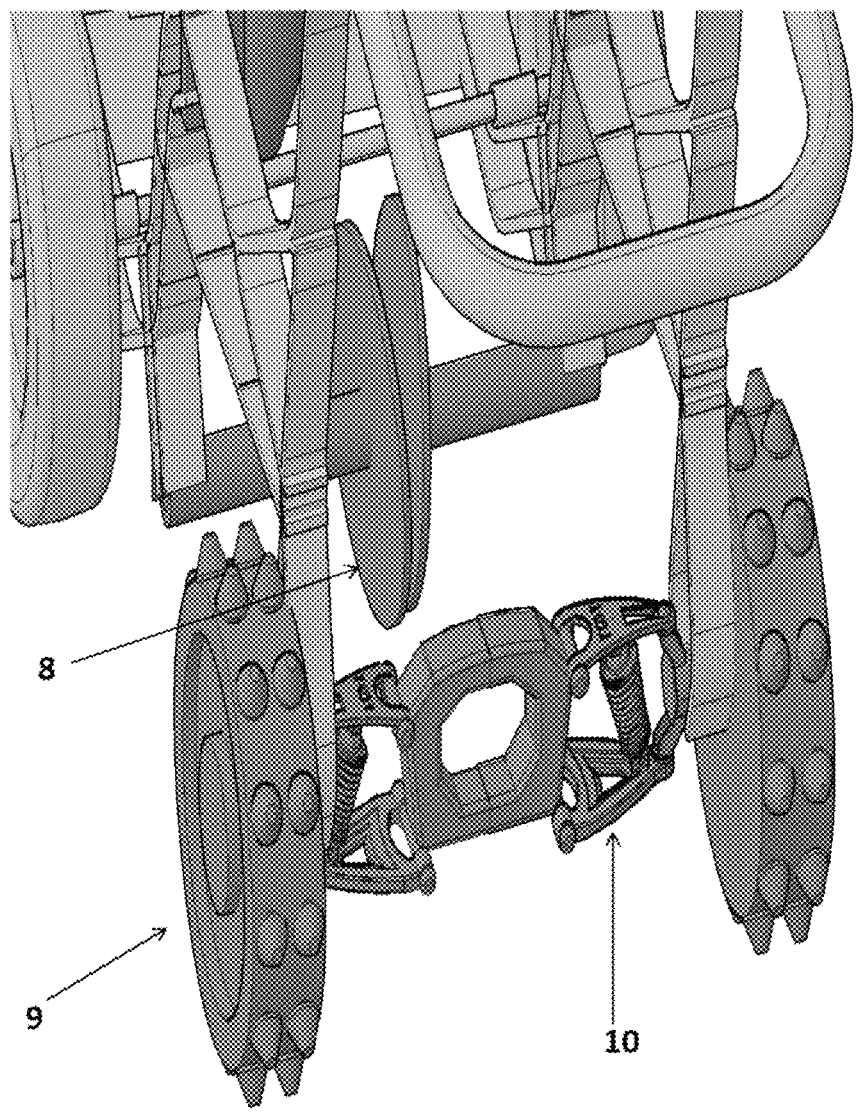
FIG. 2 illustrates a schematic view of the metallic spiked wheel base of the trolley and rear rubber air inflated tyres with independent suspensions on either side, resting on hubs with bearings holding the axle shaft connected to the wheel. The bearing housing or hub is welded to the trolley frame. The multipurpose agricultural machine is mounted, in accordance with an embodiment of the present disclosure. The inclined disk furrow opener between the front spiked metallic wheel and the rear tyre wheels can also be seen.

FIG. 2 illustrates a schematic view of the wheel base of the trolley on which the multipurpose agricultural machine is mounted and discloses a dual inclined disc furrow opener (8) which opens the soil in the plantation bed for seeding, spiked front wheels (9) for better field grip and traction and the double wishbone independent suspensions for all the four wheels to allow movement in slopped terrains or uneven field.

The machine is also suitable for terrace bed formation on inclined slopes or on mountainous terrains, for which the wheels on one side of the trolley is shortened, while plant beds are created with ploughing along the contours and moving the excavated earth on to one side for the plantation bed formation. Such contour aligned plantation beds will need to be made from the bottom end of the slope and thereafter proceed with more bed formations along the contours at the higher elevation. The machine uses a double wishbone suspension (12) as an independent suspension design,—using two (parallel) wishbone-shaped arms to hold the bearing within its housing holding the axle connected to the wheel. The bearing housing is welded to the trolley frame. The arrangement enables independent up-down vertical movement of the left wheels and right wheels.

The machine enables better control and variability of diameter of pits to be dug or varied width of troughs and plantation beds in small farms and home gardens. Human effort is less and the machine enables increased productivity in farming and management of home gardens. The auger assembly is mounted on hand operated trolley on spiked wheels (9) for easy transport and movement of the machine along a path for creation of plantation beds or for quick movement of the machine to designated locations for digging of pits. The movement in the field can also be facilitated with power motor drive, if required.

In an implementation of the present invention, a third pass along the trenches in the field is used for seed dropping. The primary hopper above the drive assembly aligned with the secondary hopper chamber to allow passage of the manure or seed between the chambers through holes on the engaging sides. The secondary hopper is fitted with the rotary churning cum feeder drum for breaking lumps of manure into the manure drop chute (5), inserted into the secondary hopper chamber. The compost/manure feeder drum, also serves as a seed metering arrangement for the seed drop into the same transparent plastic seed drop chute during seeding operation.

In an implementation of the present invention, the auger in the primary hopper is half left handed and half right handed to enable the rotating auger push the manure or seeds on to the central area and into the secondary chamber with compost/seed feeding drum which drops the compost or seed into the gravity feed chute. The dual inclined disc furrow (8) is located in the center between the wheels to enable open a furrow, when moved on the plantation bed, into which the seeds drops from the chute (10) behind the inclined furrows. With additional arrangement for raising or lowering the dual inclined furrow discs on the trolley, if needed, the depth of sinking the discs into the soil for variation of depth at which seed is dropped can be achieved.

In an implementation of the present invention, soil spill over to the trench is prevented by leveling disc harrows, which can be optionally attached by the side of the furrow opener on the gangway shaft.

Figure 3:
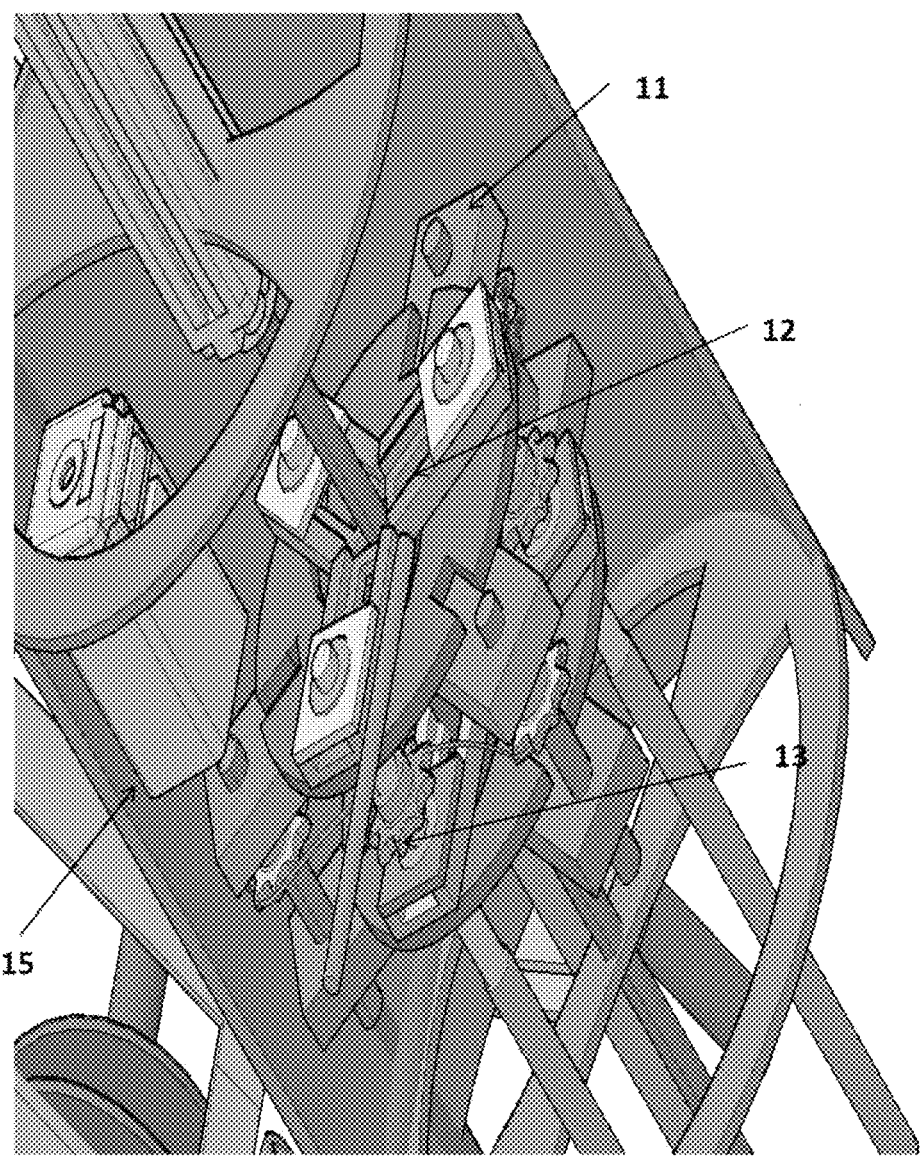
FIG. 3 illustrates a schematic view of the augers drive mechanism with auger shafts on bearing mounts, sliding within the inner and outer blocks welded on the upper and lower surface of the two flanges. The auger shafts have the sprocket wheel pinions driven by the chain drive. The three augers are connected with sleeves and bolt on to either, the auger shafts between the three pairs of inner blocks or to the auger shafts between the three pairs of outer blocks, in accordance with an embodiment of the present disclosure.

FIG. 3 illustrates a schematic view of the auger shafts drive mechanism to which the augers (7) are connected and discloses the inner blocks and the outer blocks (11), radial guide (12) on inner block for movement of the bearing mount holding the shafts and a DC motor drive (15) for rotary motion of the shafts.

A DC motor (15) drives the three augers (7) through a chain drive. The rotary drive is persistently engaged even with changes in the radial distances of the augers (7). This has been made possible with the use of sliding bearing mounts with bearings on which the shaft holding the sprocket wheel pinions rotate. The auger shafts have the sprocket wheel pinions with the chain drive on one side and the augers (7) on the other side.

There are six rotating shafts with three spring mounted bearing mounts sliding within the outer blocks, arranged radially on the bottom surface of either flange and three other bearing mounts sliding within the inner blocks on the top surface of either flange. Both the three inner blocks and three outer blocks are arranged in the radial direction on the top and bottom surface of the two flanges respectively.

There are two composite assemblies, each comprising a flange with three inner blocks on one side and three outer blocks on the other side in the drive mechanism. The arrangement enables six shafts to be mounted between the three pairs of inner blocks and between the three pairs of outer blocks. The shafts rotate while they are driven by the chain drive on their respective bearing mounts. The bearing mounts on the outer blocks are spring loaded within the blocks. The bearing mounts slide within the three inner blocks and within the three outer blocks, in a transverse radial direction,—having the effect of moving the augers (7) towards each other or away from each other. Three inner shafts with pinions mounted in between the three sets of inner blocks (three of such inner blocks are on the right/bottom flange and three corresponding inner blocks on the left/top flange) having their ends seated on bearing mounts within the inner blocks, slide both radially within the inner blocks and at the same time are also guided along the involute guideway slot on the flanges in the two composite assemblies.

Similarly, the three outer shafts with pinions have the seating on spring loaded bearing mounts sliding within the outer blocks.

Figure 4:
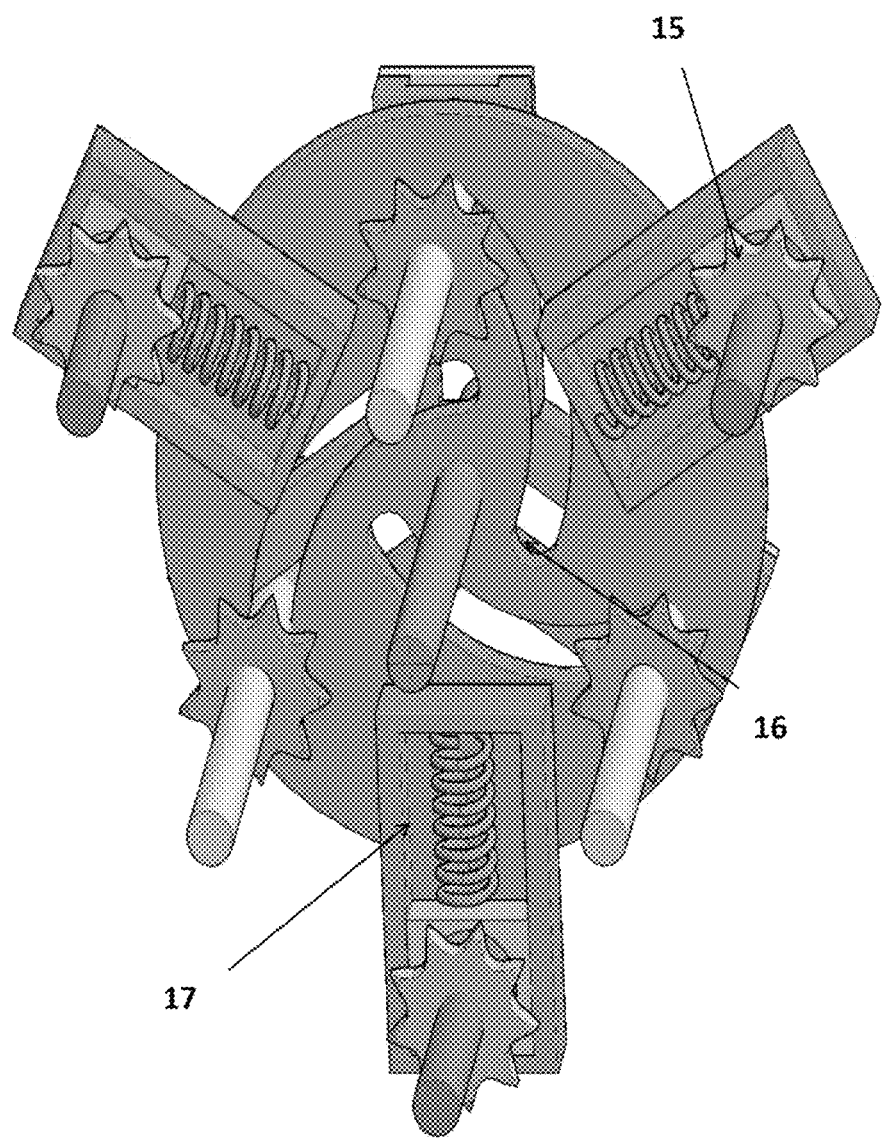
FIG. 4 illustrates a schematic view of one of the flanges, showing (a) the involute guide (b) the three auger shafts on their bearing mounts, sliding within the inner blocks on the top surface of the flange, as also (c) the three outer blocks with spring mounted bearing mounts, holding the three other shafts and their sprocket wheel pinions. The chain around the pinions is woven in such a manner that it moves on the outer circumference of the pinions in the outer block and along the inner circumference of the pinion in the inner blocks, thus retaining tension, with the same length, even as the auger shafts move radially inward along the involute guide slot or retracting outward along the same involute guide slot in a radially outward direction, with the operation of the lever to vary the distance between the three augers. Augers are mounted on either (a) the three shafts between three bearing mounts sliding within the three inner blocks or (b) on the three shafts between the outer spring loaded bearing mounts sliding within the three outer blocks. The augers drive mechanism is thus shown in accordance with an embodiment of the present disclosure.
Figure 5:
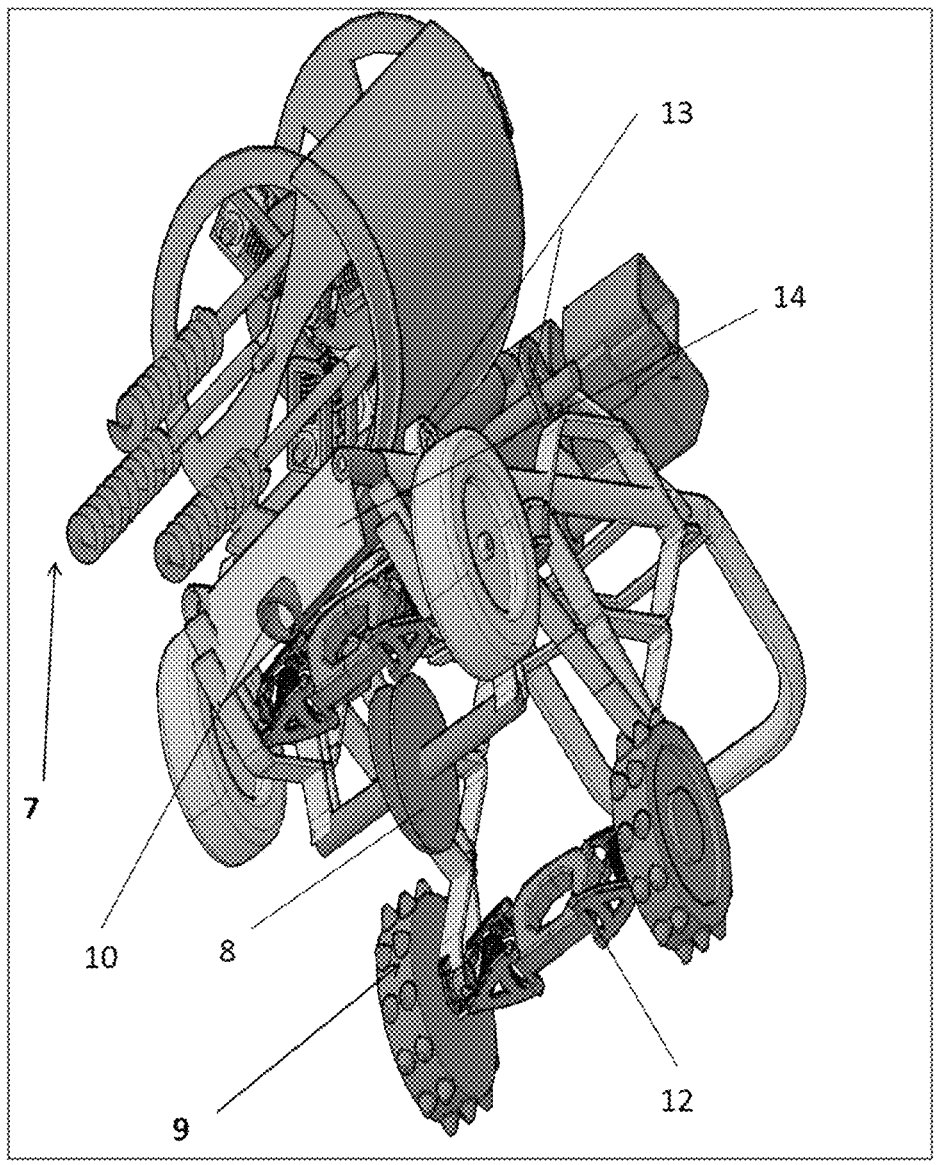
FIG. 5 illustrates a schematic downward view of the multipurpose agricultural machine, showing the three augers, manure/seed drop chute, deflector plate, independent suspension, disk furrow opener for seed dropping and the front spiked metallic wheels and rear inflated tyre wheels in accordance with an embodiment of the present disclosure. The inclined deflector plate which pushes the soil excavated by the augers on to one side of the trench, can also be seen in this view.

FIG. 4 illustrates a schematic view of the flange with the involute guide through which the inner three shafts can slide inward to bring the auger shafts towards each other and the auger drive pinions around which the chain moves to provide rotary drive to the augers (7) The figure discloses the sprocket chain pinion (15), involute guide (16) on flange for transverse movement and outer blocks (17) with spring loaded bearing mounts sliding radially within the outer blocks and auger shafts with their pinions.

These six shafts shown hold the pinions around which the drive chain is sprung and weaved, so that the chain over the pinions in the outer blocks move over the outer pinions circumference and in the three inner blocks the chain move along the inner circumference of the pinions.

The three augers (7) are fitted to either the three inner shafts or three outer shafts with sleeves and bolt. The transverse/radial movements of the inner three shafts which can hold the augers (7) is guided through an inclined involute guide on the central flange between the three inner and three outer blocks and converge towards the center. This transverse adjustment is done with the hand operated lever placed on one of the outer blocks in one of the composite assemblies. Such lever operation enables the auger shafts come towards each other, on the converging involute transverse guideway slot on the flanges as also simultaneously slide radially inward direction on the slideways in their blocks along with their bearing mounts.

When the lever is operated in the reverse, the shafts move away to expand along the involute guide on the two flanges on to a radially outward movement. When the three auger inner shafts are moved in with the lever operation, they also pull the outer auger shafts holding the outer pinions and outer bearing mounts sliding within the outer blocks inwards, as all the six pinions are driven by the chain of constant length around the six pinions.

Thus, the transverse/radial inward or outward movement of the augers (7) is effected with a lever. When the lever operated through 120 degrees, the auger shafts slide along the involute guide on the flange, so as to cause a radially inward movement of the shafts, making the auger shafts move towards each other, when rotated in one direction or move away radially, as the shafts retract along the curved path expanding outward, when the lever is reversed.

The lever is in the form of a screw rod with a tightening wheel to grip on the outer housing, so as to lock the adjusted auger distances once made, Alternatively, a ratchet and pawl mechanism on the outer end of the flanges can also ensure unidirectional movement and holding the auger shafts in place after the radial distance is adjusted. A linear actuator (2) driven by a motor is placed in the axial direction of the flange assembly parallel to the augers (7), to drive the augers (7) into the soil for the necessary depth and for their retraction as and when required. The entire assembly is mounted on a wheeled trolley to move the soil raking-augers to desired locations for
  (a) digging holes for planting samplings or for transplantation
  (b) raking the soil to loosen them for weed removal, retention of moisture, aeration or decomposition of organic matter for nourishment of the soil.
  (c) to form troughs/trenches and raised bed for planting or seeding
  (d) double digging to prepare the soil with deep layer manuring
  (e) dropping manures or seeds with hopper assembly, gravity drop feeding/metering attachment and aided by furrow opener disks/levelers
  (f) tilling in hard and dry trashy stumpy land condition and in soil where scouring is a problem, with higher torque and slower speeds.
  (g) The machine can work on sloped terrains in hill areas to make terraces for cultivation with the adjustment of height of the wheels on one side parallel to the auger axis aided by the independent suspension of the wheels enabling movement with raised wheels on one side on a sloppy terrain
  (h) While the trolley wheels are fixed in such a way that the augers are inclined to the field in the longitudinal direction of travel, when all four wheels are on ground, a further tilt with respect to direction of travel on the field is possible of the auger assembly by upto 20 degrees, as the assembly is hinged at one end and can be rotated through this additional inclination (13). When lifted to be held on the two tire wheels alone, the machine can dig vertical holes in the field.

Tines, harrows and other forms of secondary tillage equipment may not serve the needs of home gardening and small farmers needs, as effectively, as the machine with the design as above.

The augers (7) can be replaced with spiked raking rods for a second pass double digging. The rakes are toothed picket bars, with protruding sharp edges arranged in a direction perpendicular to the bar, in the radial direction, used in place of augers (7) for raking, tilling or scoring the soil in the deeper soil layer. A compost/manure drop attachment in the machine during the second pass of the machine along the trenches dug in the first pass, enables dropping of compost in the deeper soil layer, as is the recommended practice for double digging.

The machine of the present disclosure can be used with augers (7) for digging pits for planting saplings in the field or for making the trenches with the soil bed formation on one side. The arrangement of protruding spikes in the raking rod attachment can be used in place of the augers (7) for raking and scouring the soil. They can also be used in the second pass of the machine on the field to loosen a deeper soil layer as is necessary in a double digging practice. The compost is also added during this pass to enrich the deeper soil layer.

In an implementation, present invention provides a multipurpose agricultural machine, wherein said machine comprises (a) an auger assembly positioned inside an outer housing comprising at least three rotary soil excavating augers (7) configured to rotate to rake and remove soil, at least one deflector plate (6), (b) a flange assembly comprising at least one top flange mounted on a central shaft and at least one bottom flange mounted on the central shaft, plurality of auger shafts on their bearing mounts sliding within radially arranged inner and outer blocks, in communication with the rotary soil excavating augers (7), at least three spring loaded outer blocks on the top flange, at least three spring loaded outer blocks on the bottom flange, at least three inner blocks on the top flange, at least three inner blocks on the bottom flange, at least one lever configured to effect radial inward or radial outward movement of the auger shafts with respect to the central shaft axis.

In an implementation of the present invention, the rotary soil excavating augers (7) are connected with plurality of sleeves and plurality of bolts on to either, three pairs of bearing mounts sliding within their three inner blocks or three pairs of spring mounted outer bearing mounts sliding within their respective outer blocks and are arranged in a radial direction on the two flanges with the lever and the machine comprises at least three involute guideway slots (16) on the top and bottom flange for radial inward or radial outward movement of the auger shafts.

In an implementation of the present invention, there is provided a drive assembly positioned inside a drive assembly housing comprising at least six chain driven sprocket wheel pinions mounted on the inner three shafts and three outer shafts, held on bearings within their mounts sliding within the inner blocks or outer blocks. The inner blocks are welded to the top surface of the flanges and the outer blocks are welded on the bottom surface of the flanges. The flanges are welded to the central axial shaft. The auger assembly is mounted on a hand operated trolley and comprises a linear actuator (2) driven by a motor is positioned in the axial direction of the flange assembly with the rotary soil excavating augers (7) configured to drive the augers (7) into the soil.

In an implementation of the present invention, the inner blocks comprises a radial guide (12) configured for movement of the bearing mounts holding the auger shafts. The rotary drive for the auger shaft is provided by a DC motor.

In an implementation of the present invention, the machine comprises a compost drop attachment configured to feed compost into the raked layer of the soil. Further, it comprises a primary hopper chamber mounted above the drive assembly housing with an auger feeding the compost on to a secondary hopper chamber with a rotary churning and a feeder drum configured to breaks the lumps of compost, for gravity drop through the transparent drop chute.

The machine is well suited for the recommended practice of double digging for maintaining the eco-system of soil layers, adding organic matter in the form of compost and aged manure, to the deeper soil layers combined with the use of mulch or growing cover crops (green manures) for top soil. It is an improved method of preparation of soil bed for planting of agriculture and horticulture crops in small farms and home gardens. The basic premise of double digging is to create an extra deep bed of loose soil—16 to 18 inches, versus the 6 to 8 inches that most tillage creates—and is to be done preferably without inverting the soil layers.

Double-digging helps observe the condition of underlying soil and determine the nature of soil amendments to be carried out. If the soil is clay-like, then it can be lightened with peat to provide aeration and improve drainage. Double-digging provides a reservoir of nutrients and water for the plants' deeper roots.

Double digging is a gardening technique used to increase soil drainage and aeration. It involves the loosening of two layers of soil, and the addition of organic matter.

Double digging is typically done when cultivating soil in a new garden, or when deep top-soil is required. On poor or heavy soils, or for vegetable gardens, double digging might be required every 3 years or so. In other cases, double digging is only really needed on starting a new garden, or on total replanting.

Stages of Development:

Initial efforts originated from a project implemented with support from the Dept. of Science and Technology Govt. of India and Ministry of MSME Government of India, to develop a repository of Know-How and Technologies to be disseminated and shared through a web based portal for access by potential entrepreneurs, government agencies promoting entrepreneurship and communities at large. The portal developed was deployed under the URL http://indiaskillpedia.comand http://indiatechpedia.com./

The content to be uploaded and shared under various domain areas, themes and application areas were to be crowd sourced from practitioners, experts, government institution/agencies and educational institutions.

Content sourcing became a challenge, as content was not getting crowd sourced and uploaded as envisaged. This led to the realization that original content needs to be developed. A core-team thus made efforts to develop technologies, compile know-hows and disseminate such technologies, products, and applications through the portal.

The need for ushering in a DIY culture was considered important. A workshop for fabrication of machines and for training was hence set up in Barsey premises of Raj Bhavan in Gangtok. Training workshops were held in Gangtok and Mysore and the members of Indiaskillpedia foundation were encouraged to develop DIY projects, technologies, ideas and know-how, to be then disseminated and shared for promotion of entrepreneurship in various sectors like agro-farming, fabrication, apparel making, food processing.

The search for suitable DIY projects led to the opportunity for taking up ideas, concepts, projects relating to metal fabrication, mechanized agro-farming and agro-processing which are significant activities in agriculture and manufacturing sectors, offering employment and livelihood opportunities to potential entrepreneurs.

The research led to the study of numerous existing machines, which facilitate and contribute to human productivity and livelihood opportunities. In the process, numerous gaps were identified in the machines which are currently available.

The possibility of designing machines which can bridge these gaps and enable youth and upcoming generation embrace ideas that make agriculture and manufacturing more interesting presented themselves as aspects worth examining and pursuing.

Appropriately designed powered mechanical machinery can help create interest in small farmers, enable them develop their land and engage in cultivation of horticultural and mixed crops. Tilling machines can increase productivity of land/labour and lower cost of production with reduced turnaround time.

The machine designed represents low levels of investment, simple know-how, and ease of operations and management. It is suitable for cultivation of crops in small farms and backyard gardens and boosts their availability in local markets and for sales in consumer outlets. The machine can be produced in local fabrication workshops, employing simple cutting, welding technology and DIY knowhow, except for some parts like motors, bearings, chains and wheels which are sourced from hardware outlets.

Thus was born the intensive efforts to build machines which can create an interest in the youth and communities, while helping them in their pursuits for self-employment and livelihood opportunities.

From an organic farming perspective, adding organic matter in the form of compost and aged manure, or using mulch or growing cover crops (green manures), is the best way to prepare soil for planting. Organic soil is rich in humus, the end result of decaying materials such as leaves, grass clippings and compost. It holds moisture, but drains well. Good organic garden soil is loose and fluffy, filled with air that plant roots need and it has plenty of minerals essential for vigorous plant growth. It is alive with living organisms, from earthworms to fungi and bacteria, that help maintain the quality of the soil. Proper pH is also an essential characteristic of healthy soil. Plants need air, both above ground for photosynthesis and in the soil as well. Air in the soil holds atmospheric nitrogen that can be converted into a usable form for plants. Soil oxygen is also crucial to the survival of soil organisms that benefit plants.

Good soil provides just the right space between its particles to hold air that plants will use. Silty and heavy clay soils have small particles that are close together. These dense soils have little air. Sandy soils have the opposite problem; their particles are too big and spaced out. The excessive amount of air in sandy soil leads to rapid decomposition of organic matter. Adding organic matter, especially compost, will help balance the air supply (the perfect soil is about 25% air). In soils with too much pore space (sandy soils), water quickly drains through and cannot be used by plants. In dense, silt or clay soils, the soil gets waterlogged as all the pore space is filled with water. This will suffocate plant roots and soil organisms.

The above details indicate that soil preparation requires to be diligently addressed. It takes careful planning and considerable efforts. The best soils have both small and large pore spaces. Adding organic matter is the best way to improve the structure of soil through the formation of aggregates. Additionally, organic matter holds water so that plants can use it when they need it.

A healthy organism population would also be essential for nurturing a healthy soil. Soil organisms, critters make nutrients available to plants and bind soil particles into aggregates that make the soil loose and fluffy. Soil organisms include earthworms, nematodes, springtails, bacteria, fungi, protozoa, mites and many others.

Adding compost will improve almost any soil. The texture of silty and clay soils, and their nutrient levels, are radically improved from initially having the compost mixed in. All soils get better with annual applications on top.

While the initial design that was made was of a soil digging, trench making auger assembly for making pits and preparation of soil beds, it was soon realized that for double digging practices, as also considering the efforts required to prepare good organic soil it became necessary to add the attachment for manure and seed drop. This has made the design more versatile and all-purpose suitable for cultivation in small fields and back yard gardens.

Some of the non-limiting advantages of the present invention are as follows:

(a) The machine enables better control and variability of diameter of pits to be dug for planting of saplings with the adjustment of distances between the augers (7)

(b) Control of depth of earth and soil to be dug with the activation of the linear actuator (2) which drives the auger assembly into the soil (c) Make and form varied width of troughs and raised plantation beds with varied distances between the augers (7) for soil excavation and with inclined or involute shaped deflector plate (6) layering the soil on one side of the trench (d) Double digging practices for better soil nourishment in small farms and home gardens can be effectively performed with the calibrated depth of auger being driven into soil on account of the linear actuator (2) and rotary drive motor controls (e) Speed torque variations are possible to engage different soil textures, hardness of earth and for breaking varying sizes of soil lumps.

(f) Human effort is less and the machine enables increased productivity in farming and management of home gardens.

(g) The wheels fitted with tires and the metallic spiked wheels (9) enable easy transport and movement of the machine along a path for creation of plantation beds or for quick movement of the machine to designated locations for digging of pits.

(h) The height of the tire and spiked metallic wheel on the two legs on one side parallel to auger axis, can be reduced combined with the independent suspension of wheels to enable the machine work on slopes to make terrace beds suitable for plantation on sloped terrains in hilly areas.

(i) A double wishbone suspension as an independent suspension design using two (occasionally parallel) wishbone-shaped arms to locate the wheels of the trolley enable independent movement of the left wheels and right wheels.

Land and Soil preparation takes much less time with the use of the machine disclosed in the present disclosure. The length of the turnaround interval for cultivating horticultural crops can also reduce. House hold income can enhance or alternatively, external dependence for vegetables and corresponding costs can be reduced.

The machine disclosed in the present invention removes the association of mental images of hard, arduous labour for agriculture and farm based activities. Instead, they make it more acceptable both as a vocational hobby and pastime activity, as also for core farming activity or horticulture vocation to sustain livelihoods.

The machine has a number of component assemblies which can interest and intrigue a common rural educated youth. The fabrication of the machine itself could be done in a home workshop or small enterprise, with the exception of a few bought out components like bearings, motors and chains.

Youth are more likely to embrace agriculture/horticulture and develop a passion for growing crops, vegetables and fruits. They are more likely to perceive them as challenging, knowledgeable, fulfilling when employing machines and use of technology with associated gadgetry, attachments and scientific approaches. These are also associated with recognition of the occupation as a profession worthy of adoption for livelihood.

Use of gadgets is more appealing to the present generation. Agricultural implements with innovative capabilities would make them interested. Besides, the improved livelihood opportunities that get presented with farm incomes contributing to an acceptable lifestyle would be an added attraction.

Those skilled in the art will recognize other use cases, improvements, and modification to the embodiments of the present disclosure. All such improvements and other use-cases are considered within the scope of the concepts disclosed herein.

What is claimed is:

1. A multipurpose agricultural machine, wherein said machine comprising:

(a) an auger assembly positioned inside an outer housing comprising:
at least three rotary soil excavating augers (7) configured to rotate to rake and remove soil;
at least one deflector plate (6);

(b) a composite flange assembly comprising:
(i) at least one top flange mounted on a central axial shaft; and
(ii) at least one bottom flange mounted on the central axial shaft;
(iii) the axial shaft mounted on bearings on the top and bottom cover at either end of the machine housing, with such axial shaft also passing though a bush on the top and bottom cover end, beside the bearing block to permit axial movement of the shaft, capable of pushing the assembly downward or upward
(iv) a rotary drive which engages to operate a piston type linear actuator or a screw rod with nut arrangement to which the central axial shaft with composite flange and auger drive assembly is coupled, so as to push the axial shaft and assemblies with the augers to dig into the soil or to reverse and retrieve it
(v) plurality of auger shafts sliding within the flange assembly, in communication with the rotary soil excavating augers (7);
(vi) at least three spring mounted outer blocks with spring loaded sliding bearing mounts to hold one end of the three outer auger shafts on the bottom surface of the top flange;
(vii) at least three spring mounted outer blocks with spring loaded sliding bearing mounts to hold the other end of the three outer auger shafts on the bottom surface of the bottom flange;
(viii) at least three inner blocks with radially sliding bearing mounts to hold one end of the three inner auger shafts on the top surface of the top flange;
(ix) at least three inner blocks with radially sliding bearing mounts to hold the other end of the inner auger shafts on the top surface of the bottom flange;

(x) radial guides and slots (12) for the auger shafts seated on bearings in their mounts, on all the inner and outer blocks, to enable them move inward or outward within such blocks (xi) spring loading of bearing mounts on the three outer blocks, for ease of retraction to reverse inward movement (xii) involute guideway slots (16) on the top and bottom flange, in which the auger shafts get guided with the operation of a lever, to enable bring the augers towards each other or move them outward (xiii) at least one lever configured to effect radial inward or radial outward movement of the auger shafts with respect to the central shaft axis;

(xiv) a screw at the end of the lever for effecting transverse movement, with a fastening nut holding wheel to lock the flange assembly to the housing once adjustment of the distances between the augers are done or alternatively a ratchet and pawl mechanism for unidirectional movement, lock or release, as may be required to arrest and lock the transverse movement for changes to the distance between the augers wherein the rotary soil excavating augers (7) are connected with plurality of sleeves and plurality of bolts on to either, three pairs of inner blocks or three pairs of outer blocks and such inner and outer blocks are arranged along a radial direction on the two flanges with the lever;

(c) an auger drive arrangement within the flange assembly as in (b) above positioned inside the machine housing comprising:

(i) at least three chain driven sprocket wheel pinions, mounted on the inner three auger shafts held at either end, on the bearings within the three sliding bearing mounts, within the inner blocks, on the top surface of both the flanges and (ii) at least three chain driven sprocket wheel pinions, mounted on the outer three auger shafts held at either end on bearings within the three spring mounted sliding bearing mounts, within the outer blocks, on the bottom surface of both the flanges;

(iii) a chain weaving on the outer surface of the sprocket wheels on the three outer auger shafts and along the inner surface of the sprocket wheels on the three inner auger shafts (iv) a motor positioned in the axial direction of the flange assembly, coupled and driving one of the auger shafts between the outer blocks;

wherein the auger drive arrangement and flange assembly is mounted on a hand operated trolley and comprises a linear actuator (2) or screw rod/nut assembly arrangement is driven by a motor is coupled to drive the central axial shaft and is positioned in the axial direction of the flange assembly with the rotary soil excavating augers (7) configured to drive the augers (7) into the soil or retract them from out of the soil.

2. The machine as claimed in claim 1, wherein the three auger shafts and the motor for rotary motion of the auger shafts, enables the augers to excavate soil to form trenches in the soil field, while deflecting the excavated soil to form plantation beds, by the side of the trench, as the machine on its trolley is moved along the field.

3. The machine as claimed in claim 1, wherein the operating lever, for change of width of trench and the corresponding width of the plantation bed, is in the form of a screw rod with a tightening wheel with the nut fastener configured to grip on the outer housing, so as to lock the adjusted radial distances between the augers (7) from the central shaft axis, with the operation of the lever having the effect of changing the distance between the auger shafts, while ensuring that the chain drive is engaged even with change of distances between the augers.

4. The machines as claimed in claim 1, wherein the machine alternatively comprises a ratchet and a pawl mechanism on the outer end of the flanges configured to ensure unidirectional movement and holding the auger shafts in place after adjustment of the radial distances between the augers (7) and for release to readjust the distances as required.

5. The machine as claimed in claim 1, mounted on a trolley to enable its movement in the field to make troughs/plantation beds or to move between pits to be dug on the field at desired locations, for planting samplings or for transplantation, wherein the hand operated trolley comprises at least two wheels with tires and at least two metallic spiked wheels (9), that enable better traction on the field, Electric Motors or internal combustion engines are optionally fitted for traction to the wheels to assist movement in the field.

6. The machine as claimed in claim 1, wherein the hand operated trolley comprises a double wishbone independent suspension (12) for each of the wheels comprising at least two parallel wishbone-shaped arms which supports a bearing hub/housing with bearing holding a short axle connected to the wheels, The bearing hub/housing is welded to the frame of the trolley frame, The arrangement enables independent movement of all the four wheels, so as to enable (a) operate the machine with ease on uneven terrain (b) or move along sloppy terrains in hill areas in order to make terraced plantation beds along the slope.

7. The machine as claimed in claim 6, wherein the wheels comprises height adjustment feature on the trolley configured to aid movement on steeped sloppy terrains.

8. The machine as claimed in claim 1, wherein the hand operated trolley comprises a dual inclined disc furrow openers (8) configured to facilitate manure or seed drop inside the soil bed, The trolley frame has the arrangement for adjustment of the height of the inclined disc furrow openers to enable vary the depth of the furrows opened to drop the manure or seeds.

9. The machines as claimed in claim 1, wherein the machine comprises an inclined deflector plates (optionally involute shaped or appropriate adapted cross section profile) (14) configured to channelize the soil removed from field during trench formation to be deflected to form raised beds by the side of the trenches that are made, as the machine is moved along the field.

10. The machine as claimed in claim 1, wherein for the radially inward movement of the auger shafts, the lever is operated through 120 degrees to slide the auger shafts along the involute guideway slot on the flange assembly and along the radial guides in the inner and outer blocks.

11. The machine as claimed in claim 1, wherein the motor to drive the auger shafts with a chain drive is a DC motor or a Stepper motor, Alternatively, an internal combustion engine can be used to provide the rotary drive to one of the auger shafts.

12. The machine as claimed in claim 1, wherein the rotary soil excavating augers (7) are configured to be replaced with plurality of spiked raking rods configured for raking to loosen hard lumps or used in deep digging applications for applying manure in the deeper layers of the soil.

13. The machine as claimed in claim 12, wherein the raking rods are toothed picket bars, with protruding sharp edges arranged in a direction perpendicular to the bar, in the radial direction.

14. The machine as claimed in claim 1, wherein the machine comprises a primary hopper with half left handed and half right handed screw to move the manure or compost to the centre to enable such manure be guided and pushed into the secondary hopper which has a rotary feeder drum to loosen clumps and feed them into the transparent gravity drop chute attachment to feed manure or compost into the raked layer of the soil in deep digging or on to the plantation beds in a second pass.

15. The machine as claimed in claim 14, wherein the machine comprises a primary hopper chamber mounted above the drive assembly housing with the auger feeding the seeds on to a secondary hopper chamber with a rotary churning and a feeder drum acting as a metering device to drop the seeds into transparent gravity feed drop chute, on to the plantation beds aided by the furrow opener.

16. The machine as claimed in claim 1, wherein optionally the machine may comprise a battery driven DC motor or an internal combustion engine configured to motorize the hand operated trolley, providing traction for movement in the field, with a disc brake to control or stop movement.

* * * * *

UNITED STATES PATENT AND TRADEMARK OFFICE
CERTIFICATE OF CORRECTION

PATENT NO. : 11,653,584 B2
APPLICATION NO. : 17/760296
DATED : May 23, 2023
INVENTOR(S) : Jayakumar Karuppusamy It is certified that error appears in the above-identified patent and that said Letters Patent is hereby corrected as shown below:

On the Title Page

Item (54) and in the Specification Column 1, Lines 1-2:
Before "MULTIPURPOSE", please insert --A--.

Signed and Sealed this
First Day of August, 2023

Katherine Kelly Vidal
Director of the United States Patent and Trademark Office